US010323644B1

(12) United States Patent
Shakirov et al.

(10) Patent No.: US 10,323,644 B1
(45) Date of Patent: Jun. 18, 2019

(54) HIGH-SPEED MODULAR ELECTRIC SUBMERSIBLE PUMP ASSEMBLIES

(71) Applicant: Lex Submersible Pumps, FZC, Umm al Quwain (AE)

(72) Inventors: Anton Shakirov, Moscow (RU); Vitaly Koropetskiy, Moscow (RU); Iaroslav Alekseev, Moscow (RU); Vadim Batalov, Moscow (RU); Evgeniy Cheremisinov, Moscow (RU)

(73) Assignee: Lex Submersible Pumps FZC, Umm al Quwain (AE)

( * ) Notice: Subject to any disclaimer, the term of this patent is extended or adjusted under 35 U.S.C. 154(b) by 0 days.

(21) Appl. No.: 15/971,405

(22) Filed: May 4, 2018

(51) Int. Cl.
| | |
|---|---|
| H02K 5/00 | (2006.01) |
| H02K 15/03 | (2006.01) |
| F04D 13/08 | (2006.01) |
| H02K 5/132 | (2006.01) |
| E21B 43/12 | (2006.01) |

(52) U.S. Cl.
CPC ........... F04D 13/086 (2013.01); H02K 5/132 (2013.01); E21B 43/128 (2013.01); H02K 15/03 (2013.01)

(58) Field of Classification Search
CPC .. H02K 5/00; H02K 5/20; H02K 5/12; H02K 5/128; H02K 5/132; H02K 5/16; H02K 5/167; H02K 5/173; H02K 7/08; H02K 9/00; H02K 9/19; F04D 13/06; F04D 13/0633; F04D 13/0626; F04D 13/08
See application file for complete search history.

(56) References Cited

U.S. PATENT DOCUMENTS

| | | |
|---|---|---|
| 4,678,404 A | 7/1987 | Lorett et al. |
| 4,859,200 A | 8/1989 | McIntosh |
| 5,159,977 A | 11/1992 | Zabaras |
| 5,883,489 A | 3/1999 | Konrad |
| 5,898,245 A | 4/1999 | Cochimin |
| 5,923,111 A | 7/1999 | Eno et al. |
| 5,960,886 A | 10/1999 | Morrow |

(Continued)

FOREIGN PATENT DOCUMENTS

| | | |
|---|---|---|
| CA | 2875914 A1 | 1/2014 |
| WO | WO2009077714 A1 | 6/2009 |

(Continued)

OTHER PUBLICATIONS

Pump 1, Product sold on or about Feb. 2016, 1 page, Lex LLC, Moscow, Russia.

*Primary Examiner* — Tran N Nguyen
(74) *Attorney, Agent, or Firm* — Elliott & Polasek, PLLC; Douglas H. Elliott; Nathan Q. Huynh

(57) ABSTRACT

The disclosure herein includes an electric submersible pump assembly for pumping fluids from a wellbore, which electric submersible pump assembly may include: a pump; and a motor assembly coupled to the pump, the motor assembly including: a housing; a stator disposed within the housing, wherein the stator has an inner surface having a diameter; a rotor disposed in the stator, wherein the rotor has an outer surface and a magnet; a first bearing assembly disposed around the rotor; and a second bearing assembly disposed around the rotor; wherein the rotor has a length separating the first bearing assembly from the second bearing assembly; and the length divided by the diameter of the inner surface of the stator yields a ratio from 7.00 to 13.00.

2 Claims, 11 Drawing Sheets

(56) References Cited

U.S. PATENT DOCUMENTS

| | | |
|---|---|---|
| 6,167,965 B1 | 1/2001 | Bearden et al. |
| 6,481,973 B1 | 11/2002 | Struthers |
| 6,555,752 B2 | 4/2003 | Dalrymple |
| 6,615,926 B2 | 9/2003 | Hester |
| 6,794,788 B1 * | 9/2004 | Smith .................... H02K 5/132 310/254.1 |
| 7,188,669 B2 | 3/2007 | Bullock |
| 7,409,997 B2 | 8/2008 | Gay et al. |
| 7,492,069 B2 | 2/2009 | Knox et al. |
| 8,037,936 B2 | 10/2011 | Neuroth et al. |
| 8,262,369 B2 | 9/2012 | Appel et al. |
| 8,287,235 B2 | 10/2012 | Orban |
| 8,584,761 B2 | 8/2013 | Fielder et al. |
| 8,672,641 B2 | 3/2014 | Yuratich |
| 8,696,334 B2 | 4/2014 | Hunt et al. |
| 8,770,271 B2 | 7/2014 | Fielder et al. |
| 8,807,970 B2 | 8/2014 | Schlenhoff et al. |
| 8,851,165 B2 | 10/2014 | Fielder et al. |
| 2002/0067086 A1 * | 6/2002 | Kikuchi ................ H02K 1/148 310/54 |
| 2007/0096571 A1 | 5/2007 | Yuratich |
| 2008/0284268 A1 * | 11/2008 | Yuratich ............... E21B 43/128 310/156.09 |
| 2009/0151928 A1 | 6/2009 | Lawson |
| 2009/0250210 A1 | 10/2009 | Allen et al. |
| 2013/0038151 A1 * | 2/2013 | Ohashi .................... H02K 1/32 310/59 |
| 2013/0043034 A1 | 2/2013 | Drablier et al. |
| 2014/0209292 A1 | 7/2014 | Watson et al. |
| 2015/0064032 A1 * | 3/2015 | Sadana ............... F04D 29/5806 417/423.3 |
| 2015/0308434 A1 * | 10/2015 | Crane .................... F04D 13/12 417/54 |

FOREIGN PATENT DOCUMENTS

| | | |
|---|---|---|
| WO | WO2013140184 A3 | 9/2013 |
| WO | WO2015065574 A1 | 5/2015 |
| WO | WO2015178887 A1 | 11/2015 |

* cited by examiner

← 450

| # | POWER OUTPUT, kW | HOUSING OD, MM | RATED SPEED, RPM | L/D |
|---|---|---|---|---|
| 1 | 22 | 103 | 10000 | 3.57 |
| 2 | 32 | 117 | 10000 | 5.71 |
| 3 | 45 | 117 | 10000 | 7.14 |
| 4 | 45 | 103 | 10000 | 7.14 |
| 5 | 150 | 110 | 8500 | 7.93 |
| 6 | 225 | 123 | 8500 | 9.52 |

FIG. 4C

HIGH-SPEED MODULAR ELECTRIC SUBMERSIBLE PUMP ASSEMBLIES

BACKGROUND

1. Field of Inventions

The field of this application and any resulting patent is electric submersible pumps.

2. Description of Related Art

Various high-speed modular electric submersible pump assemblies and methods for pumping fluids from a wellbore have been proposed and utilized, including some of the methods and structures disclosed in the references appearing on the face of this patent. However, those methods and structures lack the combination of steps and/or features of the methods and/or structures covered by the patent claims below. Furthermore, it is contemplated that the methods and/or structures covered by at least some of the claims of this issued patent solve many of the problems that prior art methods and structures have failed to solve. Also, the methods and/or structures covered by at least some of the claims of this patent have benefits that would be surprising and unexpected to a hypothetical person of ordinary skill with knowledge of the prior art existing as of the filing date of this application.

SUMMARY

The disclosure herein includes an electric submersible pump assembly for pumping fluids from a wellbore, which electric submersible pump assembly may include: a pump; and a motor assembly coupled to the pump, the motor assembly including: a housing; a stator disposed within the housing, wherein the stator has an inner surface having a diameter, a rotor disposed in the stator, wherein the rotor has an outer surface and a magnet; a first bearing assembly disposed around the rotor; and a second bearing assembly disposed around the rotor, wherein the rotor has a length separating the first bearing assembly from the second bearing assembly; and the length divided by the diameter of the inner surface of the stator yields a ratio from 7.00 to 13.00.

The disclosure herein includes an electric submersible pump assembly for pumping fluids from a wellbore, which electric submersible pump assembly may include: a pump; a motor assembly coupled to the pump, the motor assembly including: a first housing; a stator disposed in the first housing, wherein the stator has an inner surface that defines a diameter, a rotor disposed in the stator; a first bearing assembly disposed around the rotor; and a second bearing assembly disposed around the rotor; wherein the rotor has length separating the first bearing assembly from the second bearing assembly, and the length divided by the diameter of the inner surface of the stator yields a ratio from 7.00 to 13.00; and a module coupler coupled to the motor assembly, the module coupler including: a second housing; an upper coupler body disposed in the second housing, wherein the upper coupler body has an aperture; and a lower coupler body disposed in the second housing, wherein the lower coupler body has an aperture.

BRIEF DESCRIPTION OF THE DRAWINGS

FIG. 4C shows a table diagram illustrating test data and power output based on various dimensional configurations of a permanent magnetic motor.

DETAILED DESCRIPTION

1. Introduction

Figure 1:
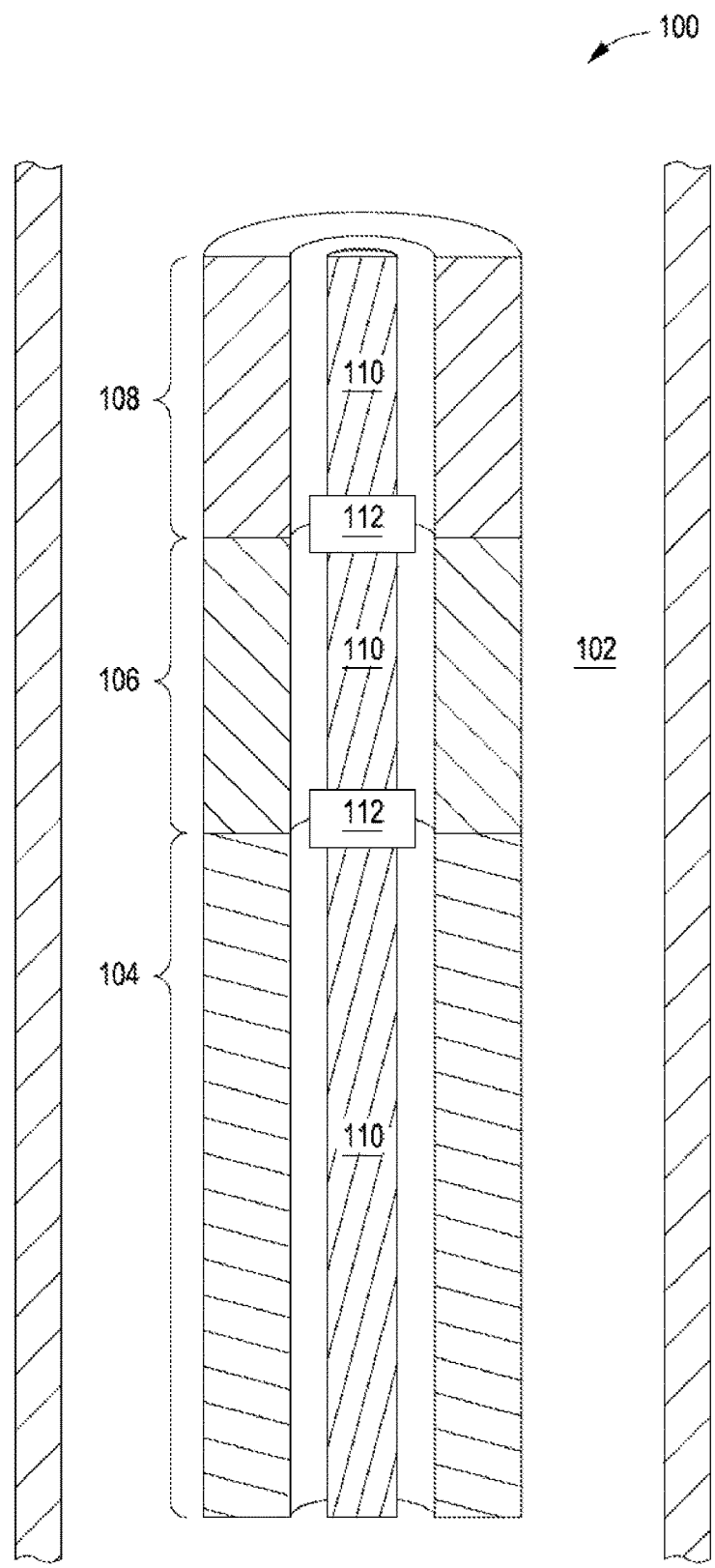
FIG. 1 shows a block diagram of an electric submersible pump (ESP) assembly disposed in a wellbore.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "aligning" as used herein is defined as a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile.

The term "aperture" as used herein is defined as any opening in a solid object or structure. For example, an aperture may be an opening that begins on one side of the solid object and ends on the other side of the object. An aperture may alternatively be an opening that does not pass entirely through the object, but only partially passes through, e.g., a groove. An aperture can be an opening in an object that is completely circumscribed, defined, or delimited by the object itself. Alternatively, an aperture can be an opening in the object formed when the object is combined with one or more other objects or structures. One or more apertures may be disposed and pass entirely through a module coupler body, a plug coupler, and/or a shaft assembly. An aperture may receive another object and permit ingress and/or egress of the object through the aperture. Thus, a plug coupler may be received in an aperture of a module coupler body. An aperture may have a shoulder extending from the surface of the aperture. For example, an aperture in a module coupler body may have a shoulder extending from the module coupler body, wherein the head of a threaded assembly may be abutted against the shoulder. A threaded portion of a thread assembly may extend through a shoulder of an aperture of a module coupler body.

The term "assembly" as used herein is defined as any set of components that have been fully or partially assembled together. A group of assemblies may be coupled to form a body having an inner surface and an outer surface.

The term "bearing assembly" as used herein is defined as an assembly capable of supporting a shaft assembly as it rotates. In some cases, a bearing assembly does not physically touch a shaft assembly. A bearing assembly may be disposed concentrically around a shaft assembly, as shown in FIGS. 3, 4A, 5, and 6. A bearing assembly may include a bushing, e.g., a sleeve. A bearing assembly may receive a rotatable shaft assembly therethrough, in which a clearance may exist between surfaces of the bearing assembly and the shaft. A bearing assembly may include an axial support bearing, a journal bearing, or a thrust bearing. A bearing assembly may be disposed at each end of a shaft assembly. A bearing assembly may be disposed on a rotor. Two bearing assemblies may be disposed on a rotor, separated by a length of the rotor between the bearing assemblies.

The term "impeller" as used herein is defined as an assembly capable of rotating within a body. An impeller, when rotating, may cause flow of fluid, e.g., water, lubricant, or hydrocarbon. An impeller may be coupled to a rotatable shaft. One or more impellers may be disposed in a module of a motor section, e.g., motor head module, a power module, and/or a cooling pump module. One or more impellers may be disposed in a module of a seal section, e.g., thrust bearing module and/or a seal chamber module. One or more impellers may be disposed in a module of a gas separator module and/or a centrifugal pump module.

The term "magnetic portion" as used herein is defined as any portion of the rotor that includes a magnet. Where a rotor has a magnetic portion, and two bearing assemblies are disposed on the rotor, the two bearing assemblies may be equidistant from the magnetic portion of the rotor disposed between the bearing assemblies. That is, the distance separating the magnetic portion from one bearing assembly may be equal to the distance separating the magnetic portion from another. For example, an upper bearing assembly with a lower edge and a lower bearing assembly with an upper edge may be disposed on a rotor, the rotor may have a magnetic portion between the two bearing assemblies; the magnetic portion may have an upper edge and a lower edge; a first distance may separate the upper edge of the magnetic portion from the lower edge of the upper bearing assembly; and a second distance may separate the lower edge of the magnetic portion from the upper edge of the lower bearing assembly.

The term "clearance" as used herein is defined as a space between two or more structures. In some cases, where a clearance exists between structures, the structures may not be in physical contact with each other. A clearance may be integral with, e.g., part of, a fluid reservoir, through which fluid may flow. A clearance may exist between two cylindrical structures in which one cylindrical structure is concentrically disposed within the other. A clearance may exist between the inner surface of a bearing assembly and the outer surface of a shaft assembly. A clearance may be an annular space between two concentric cylindrical structures. For example, a clearance may exist between an inner surface of a stator and an outer surface of a rotor. That clearance may be measured in terms of a radial distance, measured as the radial distance from the outer surface of the rotor to the inner surface of the surrounding stator. In another example, a clearance may exist between the housing of an ESP component and a body, e.g., coupled assemblies, disposed therein.

The term "coupled" as used herein is defined as directly or indirectly connected, attached, or integral with, e.g., part of. A first object may be coupled to a second object such that the first object is positioned at a specific location and orientation with respect to the second object. For example, two shorter shaft assemblies may be coupled to form a longer shaft assembly. A first object may be either permanently or removably coupled to a second object. Two objects may be permanently coupled to each other via adhesive, or welding, or they may be mechanically pressed together, or they may be removably coupled via module couplers, collets, screws, or nuts and bolts. Thus, a module coupler may be removably coupled to an end of an ESP assembly module such that the module coupler may then be uncoupled and removed from the module. A section of an ESP assembly, e.g., motor section, seal section, or pump section, may be removably coupled to an end of another ESP assembly section such that the section may then be uncoupled and removed from the other section. Also, two objects may be capable of being slidably coupled together, e.g., where a castellated inner diameter of one object is capable of engaging and meshing with or to a castellated outer diameter of another object. Thus, a module coupler having a castellated inner diameter may be slidably coupled to an end of a shaft assembly having a castellated outer diameter. Furthermore, a module coupler may, at an end, be slidably coupled to a first shaft assembly and, at an opposing end, be slidably coupled to a second shaft assembly. Additionally, two objects may be capable of being threadably coupled together, e.g., where a threaded outer surface of one object is capable of engaging with or to a threaded inner surface of another object. Thus, a threaded assembly may be threadably coupled to a threaded portion of an ESP component, e.g., power module, where a threaded inner surface of the ESP component engages with or to a threaded outer surface of the threaded portion of the threaded assembly.

The term "cylindrical" as used herein is defined as shaped like a cylinder, e.g., having straight parallel sides and a circular or oval or elliptical cross-section. A cylindrical body or structure, e.g., shaft assembly, module coupler, or bearing assembly, may be completely or partially shaped like a cylinder. A cylindrical body, e.g., shaft assembly or rotor, that has an outer diameter that changes abruptly may have a radial face or "lip" (see, e.g., 402, FIGS. 2-4) extending toward the center axis. A cylindrical body may have an aperture that extends through the entire length of the body to form a hollow cylinder that is capable of permitting fluid to pass through, e.g., lubricant or motor oil. On the other hand, a cylindrical structure may be solid, e.g., rod or peg. A drive shaft assembly is an example of a solid cylindrical body.

The term "flow path" as used herein is defined as a conduit or space through which fluid, e.g., lubricant or motor oil, is capable of flowing. A flow path may be a groove disposed in an outer surface of a body, e.g., a stator, one or more bearing assemblies, one or more thrust assemblies, one or more components. A flow path may be disposed within a housing of a motor section component, e.g., motor head module, power module, or cooling pump module. A flow path may be integral with, e.g., part of, a fluid reservoir. A flow path may extend uninterrupted from one end of a body to another end of the body. A flow path may be formed by a groove disposed on a body, e.g., stator. A flow path may be formed by the inner surface of a housing and one or more surfaces of a body, e.g., group of coupled assemblies, disposed within the housing. A flow path may be formed from two or more flow paths, through which fluid may be flowed.

The term "fluid" as used herein is defined as a material that is capable of flowing. A fluid may be a liquid or a gas. A fluid may be a mixture of two or more fluids, e.g., liquids or gases. A fluid may be a lubricant, e.g., motor oil. A fluid may absorb heat. A fluid may have properties such as viscosity, anti-foaming, thermal stability, thermal conductivity, and thermal capacity.

The term "fluid port" as used herein is defined as an opening in a structure for providing the discharge of fluid. A fluid port may be disposed in a shaft assembly. A fluid port may extend through a shaft assembly. A fluid port may extend in a direction perpendicular to the axis of a shaft assembly. Fluid ports may be arranged symmetrically around a shaft assembly. In some cases, fluid ports may not necessarily be precisely the same circumferential distance apart. The preferable circumferential distance between each fluid port in a shaft assembly may be approximately 360 degrees divided by the number of ports.

The term "fluid reservoir" as used herein is defined as a volumetric space that contains fluid, e.g., lubricant. A fluid reservoir may be used to store fluid. A fluid reservoir may be defined by a housing. A fluid reservoir may be defined by the inner surface of a housing and one or more surfaces of a body, e.g., group of coupled assemblies, disposed within the housing. A fluid reservoir may have an upper end and a lower end. Fluid may be flowed within a fluid reservoir. For instance, an impeller may be disposed within a fluid reservoir such that turning the impeller generates differential pressure to cause fluid to flow from one end of the fluid reservoir to the other. A fluid reservoir may be in fluid communication with a flow path. Preferably, an upper end of the fluid reservoir may be in fluid communication with an upper end of a flow path and a lower end of the fluid reservoir may be in fluid communication with a lower end of the flow path, thereby forming a fluid circulation loop.

The term "groove" as used herein is defined as an indentation in a surface. A groove may extend in a straight line from one end to another. A groove may extend in a meandering path from end to another, e.g., a S-shaped or C-shaped path. A groove may have a cross-section that is V-shaped. A groove may have a cross-section that is rectangular. A groove may have a cross-section that is arcuate, e.g., U-shaped.

The term "housing" as used herein is defined as a structure, preferably a cylindrical sleeve, configured to be filled with fluid, e.g., lubricant or motor oil. A housing may have a central aperture. A housing may have one or more threaded ends for coupling with another housing. Multiple housings may be coupled axially to form a larger housing. A housing may include multiple sections, e.g., power section, seal section, and pump section. A housing may be coupled to a module coupler. Two housings may be couple by a module coupler. A housing and body disposed therein may share a central aperture.

The term "magnet" as used herein is defined as an object that produces a magnetic field. A magnet may be made from a material that has been magnetized and creates its own persistent magnetic field, e.g., a permanent magnet. A magnet may include a strong rare-earth permanent magnet, e.g., Samarium Cobalt (Sm—Co) or Neodymium Iron Boron (Nd—Fe—B). A magnet may be a wall or may alternatively be a cylindrical, polygonal, and/or irregular structure, or a tubular structure, rod, polygonal cube, or walls having irregular contours. A magnet may be an arcuate wall.

The term "arcuate wall" as used herein is defined as any curved wall or structure having a curved planar surface. An arcuate wall may be a wall having curved sides that may or may not be parallel to one another. For example, an arcuate wall may be a curved wall whose cross section resembles a letter "C," as exemplified by some of the magnets disclosed herein. Thus, for example, a magnet may be an arcuate wall with parallel curved sides.

The term "module" as used herein is defined as a structure that can be coupled with one or more other structures into a larger structure, e.g., motor section, seal section, pump section, or ESP assembly. A module may include one or more motor head modules, one or more power modules, one or more cooling pump modules, one or more seal thrust modules, one or more seal chamber modules, one or more pump modules, and/or one or more gas separators that can be coupled with one or more other modules into a larger structure. Thus, for example, motor head modules, power modules, cooling pump modules, and/or seal thrust modules may be coupled to form a motor section; seal thrust modules and/or seal chamber modules may be coupled to form a seal section; and pump modules and/or gas separator modules may be coupled to form a pump section.

The term "module coupler" as used herein is defined as a structure capable of coupling two or more modules of a motor section of an ESP assembly. A module coupler may have a cylindrical shape. A module coupler may include two coupler bodies disposed concentrically within a housing. Fluid may be communicated between two module couplers that are coupled, e.g., adjacent to each other in a housing. A module coupler may include a shaft coupler for coupling two shaft assemblies. A module coupler may include a plug coupler for coupling two electrical plugs from respective motor modules.

The term "plug" as used herein is defined as a structure capable of coupling to a plug coupler. A plug may be coupled to an electrical wire. A plug may conduct electricity. A plug may have a male end that is capable of being coupled to a female end of a plug coupler.

The term "plug coupler" as used herein is defined as a structure capable of coupling two or more plugs. A plug coupler may have a cylindrical shape. A plug coupler may have a first female end for receiving a first plug and a second female end for receiving a second plug (see, e.g., 216, FIG. 2B).

The term "radial distance" as used herein is defined as the distance between two concentric surfaces. For example, a radial distance may be the distance between the inner surface of a stator and the outer surface of a magnetic portion of a rotor, as shown in FIG. 4B. In another example, a radial distance may be the distance between the inner surface of a body and the outer surface of a shaft assembly rotor, as illustrated in FIGS. 1, 2A, 3, 4A, and 5-7. The radial distance between the inner surface of a stator and the outer surface of a magnetic portion of a rotor may be as small as 0.20 mm, 0.30 mm, 0.35 mm, 0.40 mm, 0.45 mm, 0.50 mm, or 0.55 mm and as large as 0.60 mm, 0.65 mm, 0.70 mm, 0.75 mm, 0.80 mm, 0.85 mm, 0.90 mm, 1.00 mm, 1.10 mm, 1.20 mm, or larger.

The term "rotor" as used herein is defined as a cylindrical structure capable of rotating, e.g., rotating relative to a stator in response to energization of the stator. A rotor may be disposed within a stator. A rotor may include a rotor body, one or more shaft assemblies, a magnetic portion having one or more magnets, and/or a sleeve. A rotor may be integral with, e.g., part of, a shaft assembly. A rotor may be a shaft assembly. A rotor may be coupled to one or more shaft assemblies. A rotor may have a magnetic portion. A rotor may have a magnetic portion having magnets disposed thereon. A rotor may have a magnetic portion disposed within a stator.

The term "shaft assembly" as used herein is defined as an assembly capable of rotating about an axis. A shaft assembly may be a rotor. A shaft may be rotatably coupled to an ESP assembly. A shaft assembly may be formed from two coupled shaft assemblies such that torque and axial load may be transferred from one shaft assembly to the other. A shaft assembly may span multiple sections of an ESP assembly, e.g., motor sections, seal sections, and pump sections, in which multiple shaft assemblies are coupled to form the shaft assembly. A shaft assembly may include one or more impellers coupled to the shaft assembly.

The term "stator" as used herein is defined as a structure that is part of an electric motor. Preferably, a stator is a portion of an electric motor that remains fixed with respect to rotating parts, e.g., shaft, rotor, and/or impeller. A stator may be part of a motor, e.g., a permanent magnet motor (PMM) or induction motor. A stator may have a central aperture. A stator may have one or more flow paths disposed in its outer surface.

The term "surface" as used herein is defined as any face of a structure. A surface may also refer to that cylindrical area that extends radially around a cylinder which may, for example, be part of a shaft assembly or bearing assembly. A surface may also refer to that cylindrical area that extends radially around a cylinder which may, for example, be part of a housing, a stator, a rotor, or a shaft assembly. A surface may have irregular contours. A surface may be formed from components, e.g., bearing assemblies, bodies, and/or housings, coupled together. Coupled components may form irregular surfaces.

The term "threaded" as used herein is defined having threads. Threads may include one or more helical protrusions or grooves on a surface of a cylindrical object. Each full rotation of a protrusion or groove around a threaded surface of the object is referred to herein as a single "thread." A threaded assembly may include a "threaded portion" wherein a section of the threaded assembly includes threads. A threaded portion may have a diameter sized to extend through an aperture of a module coupler body. In certain cases, a threaded portion of a structure may be removably coupled to a threaded assembly.

The term "unitary" as used herein means having the nature, properties, or characteristics of a single unit. For example, a shaft and a rotor may be unitary where they are connected, directly or indirectly, and fulfill the intended purpose of being rotated. Also, a shaft and an impeller may be unitary where they are connected, directly or indirectly, and fulfill the intended purpose of being rotated to move fluid, e.g., water, hydrocarbon, or lubricant.

3. Certain Specific Embodiments

Certain specific embodiments of methods, structures, elements, and parts are described below, which are by no means an exclusive description of the inventions. Other specific embodiments, including those referenced in the drawings, are encompassed by this application and any patent that issues therefrom.

The disclosure herein includes an electric submersible pump assembly for pumping fluids from a wellbore, which electric submersible pump assembly may include: a pump; and a motor assembly coupled to the pump, the motor assembly including: a housing, a stator disposed within the housing, wherein the stator has an inner surface having a diameter, a rotor disposed in the stator, wherein the rotor has an outer surface and a magnet; a first bearing assembly disposed around the rotor; and a second bearing assembly disposed around the rotor; wherein the rotor has a length separating the first bearing assembly from the second bearing assembly; and the length divided by the diameter of the inner surface of the stator yields a ratio from 7.00 to 13.00.

The disclosure herein includes an electric submersible pump assembly for pumping fluids from a wellbore, which electric submersible pump assembly may include: a pump; a motor assembly coupled to the pump, the motor assembly including: a first housing; a stator disposed in the first housing, wherein the stator has an inner surface that defines a diameter, a rotor disposed in the stator; a first bearing assembly disposed around the rotor; and a second bearing assembly disposed around the rotor; wherein the rotor has length separating the first bearing assembly from the second bearing assembly, and the length divided by the diameter of the inner surface of the stator yields a ratio from 7.00 to 13.00; and a module coupler coupled to the motor assembly, the module coupler including: a second housing; an upper coupler body disposed in the second housing, wherein the upper coupler body has an aperture; and a lower coupler body disposed in the second housing, wherein the lower coupler body has an aperture.

The disclosure herein includes an electric submersible pump assembly for pumping fluids from a wellbore, which electric submersible pump assembly may include: a pump; a housing coupled to the pump; a body disposed in the housing, wherein the body has a central aperture, an outer surface, and a flow path disposed in the outer surface; and a shaft assembly disposed in the central aperture of the body, wherein the shaft assembly has a central flow path and a port.

The disclosure herein includes an electric submersible pump assembly for pumping fluids from a wellbore, which electric submersible pump assembly may include: a pump; a housing coupled to the pump; a stator disposed in the housing, wherein the stator has an inner surface that defines a central aperture, an outer surface, and a flow path disposed in the outer surface; and a rotor disposed in the central aperture of the stator, wherein the rotor has an outer surface, a magnet, a central flow path, and a port.

In any one of the methods or structures disclosed herein, a radial distance between the inner surface of the stator and the outer surface of the rotor may be at least 0.50 millimeter.

Any one of the methods or structures disclosed herein may further include sleeve slidably coupled to the magnet.

In any one of the methods or structures disclosed herein, the magnet may be disposed in the stator.

In any one of the methods or structures disclosed herein, the magnet may be disposed between the first bearing assembly and the second bearing assembly.

In any one of the methods or structures disclosed herein, the first bearing assembly and the second bearing assembly may be equidistant from the magnet.

In any one of the methods or structures disclosed herein, the motor is capable of operating at speeds greater than 4,500 rpm.

In any one of the methods or structures disclosed herein, the magnet may have an arcuate shape.

In any one of the methods or structures disclosed herein, the magnet may be rectangular.

In any one of the methods or structures disclosed herein, each bearing assembly may be coupled to the housing.

In any one of the methods or structures disclosed herein, the rotor may be slidably coupled to the upper coupler body and the lower coupler body.

In any one of the methods or structures disclosed herein, the rotor may be extended through the upper coupler body and the lower coupler body.

In any one of the methods or structures disclosed herein, the aperture of the upper coupler body may be aligned with the aperture of the lower coupler body.

In any one of the methods or structures disclosed herein, the upper coupler body may be adjacent to the lower coupler body.

In any one of the methods or structures disclosed herein, the lower coupler body and the upper coupler body are capable of being moved relative to each other.

In any one of the methods or structures disclosed herein, the lower coupler body and the upper coupler body are each capable of being moved relative to the second housing.

Any one of the methods or structures disclosed herein may further include a plug coupler having an upper end and a lower end.

In any one of the methods or structures disclosed herein, the upper end of the plug coupler may be disposed in the aperture of the upper coupler body.

In any one of the methods or structures disclosed herein, the lower end of the plug coupler may be disposed in the aperture of the lower coupler body.

In any one of the methods or structures disclosed herein, the port may be in fluid communication with the central flow path.

In any one of the methods or structures disclosed herein, the port may be in fluid communication with the flow path of the body.

Any one of the methods or structures disclosed herein may further include a centrifugal impeller coupled to the shaft assembly.

Any one of the methods or structures disclosed herein may further include a centrifugal impeller coupled to the shaft assembly for pumping fluid through the central flow path of the shaft assembly.

Any one of the methods or structures disclosed herein may further include a centrifugal impeller coupled to the shaft assembly for pumping fluid through the port of the shaft assembly.

In any one of the methods or structures disclosed herein, a radial distance between the inner surface of the stator and the outer surface of the rotor may be at least 0.50 millimeter.

In any one of the methods or structures disclosed herein, the radial distance between the inner surface of the stator and the outer surface of the rotor may be based on a Reynolds number greater than 1500.

Any one of the methods or structures disclosed herein may further include: a first bearing assembly disposed around the rotor; and a second bearing assembly disposed around the rotor; wherein the first bearing assembly and the second bearing assembly are separated by a portion of the rotor having a length, wherein the inner surface of the stator has a diameter, and wherein the length divided by the diameter of the inner surface of the stator is from 7.00 to 13.00.

In any one of the methods or structures disclosed herein, the first bearing assembly may be disposed above the stator and the second bearing assembly is disposed below the stator.

In any one of the methods or structures disclosed herein, the first bearing assembly may be equidistant from the magnet.

In any one of the methods or structures disclosed herein, the rotor may further include a sleeve coupled to the magnet.

Any one of the methods or structures disclosed herein may further include a centrifugal impeller coupled to the rotor.

Any one of the methods or structures disclosed herein may further include a centrifugal impeller coupled to the rotor and capable of pumping fluid through the central flow path of the rotor.

Any one of the methods or structures disclosed herein may further include a centrifugal impeller coupled to the rotor and capable of pumping fluid through the port of the rotor.

In any one of the methods or structures disclosed herein, the housing may include a plurality of sections coupled one to another.

In any one of the methods or structures disclosed herein, the housing is configurable to be fully or partially filled with fluid.

In any one of the methods or structures disclosed herein, the central flow path may be disposed in the shaft assembly.

In any one of the methods or structures disclosed herein, the flow path of the stator may have a cross-section that is U-shaped.

4. Specific Embodiments in the Drawings

The drawings presented herein are for illustrative purposes only and do not limit the scope of the claims. Rather, the drawings are intended to help enable one having ordinary skill in the art to make and use the claimed inventions.

This section addresses specific embodiments of the inventions shown in the drawings, which relate to electric submersible pump assemblies, elements and parts that can be part of an electric submersible pump assembly, and methods for pumping downhole fluids. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

FIG. 1 illustrates a block representation of a downhole electric submersible pump (ESP) assembly 100 installed in a wellbore 102. The ESP assembly 100 may be suspended on tubing. A power cable (not shown) from the surface may be strapped alongside the tubing. The ESP assembly 100 may include a motor section 104, a seal section 106, and a pump section 108. The upper end of the motor section 104 may be coupled to the lower end of the seal section 106. The upper end of the seal section 106 may be coupled to the lower end of the pump section 108.

In other versions, the relative positions of the sections may be reversed, e.g., from bottom to top. For example, the upper end of the pump section 108 may be coupled to the lower end of the seal section 106. The upper end of the seal section 106 may be coupled to the lower end of the motor section 104.

A shaft assembly 110 may be disposed concentrically within the ESP assembly 100, as shown in FIG. 1. Moreover, the shaft assembly 110 may be rotatably coupled to the ESP assembly 100. The shaft assembly 110 may be constructed from shorter shaft assemblies coupled at their ends to one another.

Two shaft assemblies 110 may be coupled to a shaft coupler 112. The shaft coupler 112 may have an inner surface that defines an aperture within the shaft coupler 112. The aperture may be extended through the ends of the shaft coupler 112. The inner surface of the shaft coupler 112 and outer surface of the ends of each shaft assembly 110 may have complementary contours or castellation. Thus, an end of each shaft assembly 110 may be inserted into the aperture of the shaft coupler 112. The shaft coupler 112 is capable of transferring torque between two coupled shaft assemblies 110.

Figure 2A:
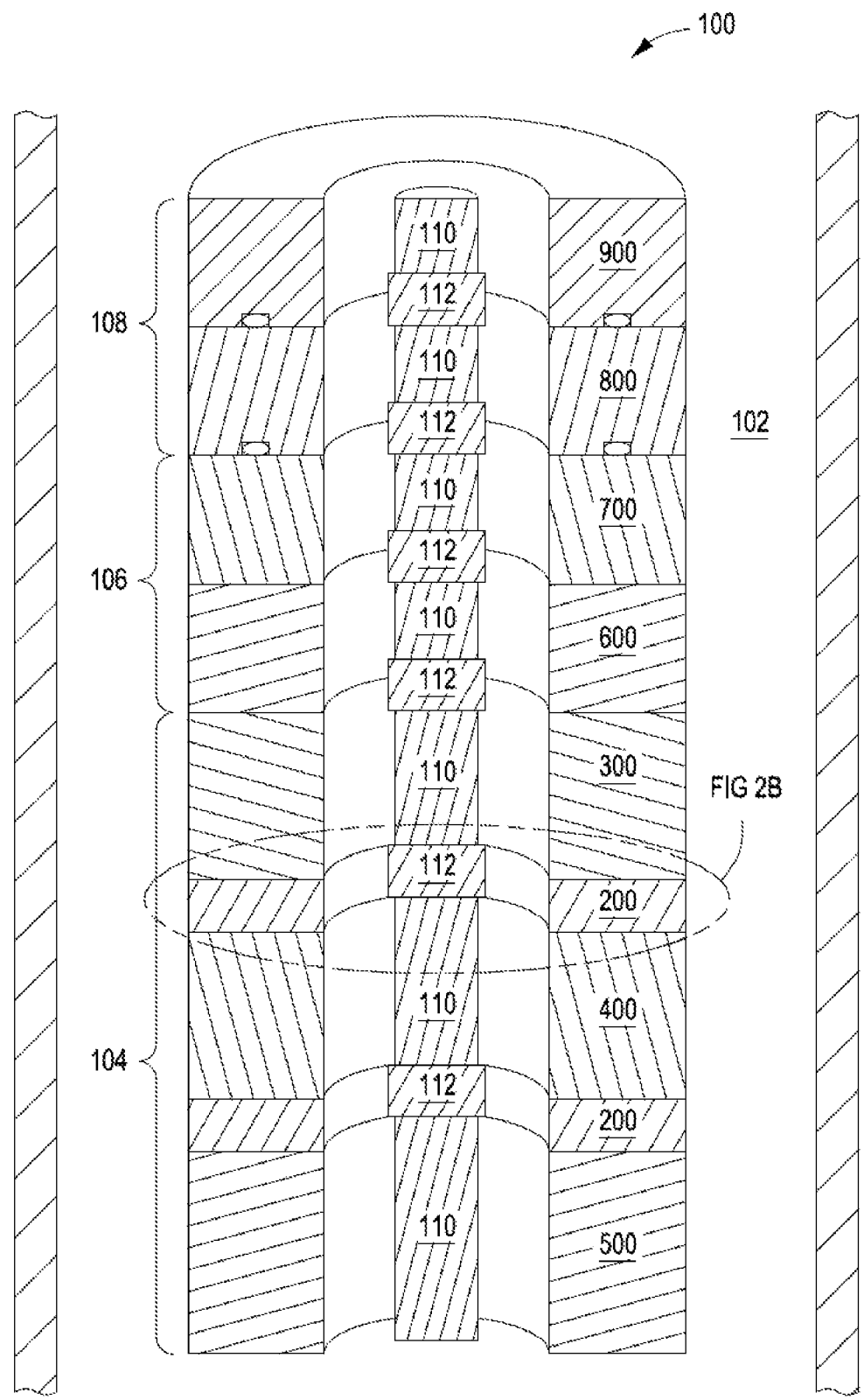
FIG. 2A shows a block representation of a cross-sectional side view of sections of an ESP assembly.

FIG. 2A illustrates a block representation of a cross-sectional side view of sections of the ESP assembly 100 further divided into smaller modules. For example, the motor section 104 may include a motor head module 300, a power module 400, and a cooling pump module 500. The seal section 106 may include a thrust bearing module 600 and a seal chamber module 700. The pump section 108 may include a gas separator module 800 and a centrifugal pump module 900. Alternatively, the pump section 108 may include the seal section 106. The sections and modules are not drawn to scale.

In the motor section 104, the motor head module 300 may be coupled to the power module 400 via a module coupler 200. Further, the power module 400 may be coupled to the cooling pump module 500 via another module coupler 200.

Figure 2B:
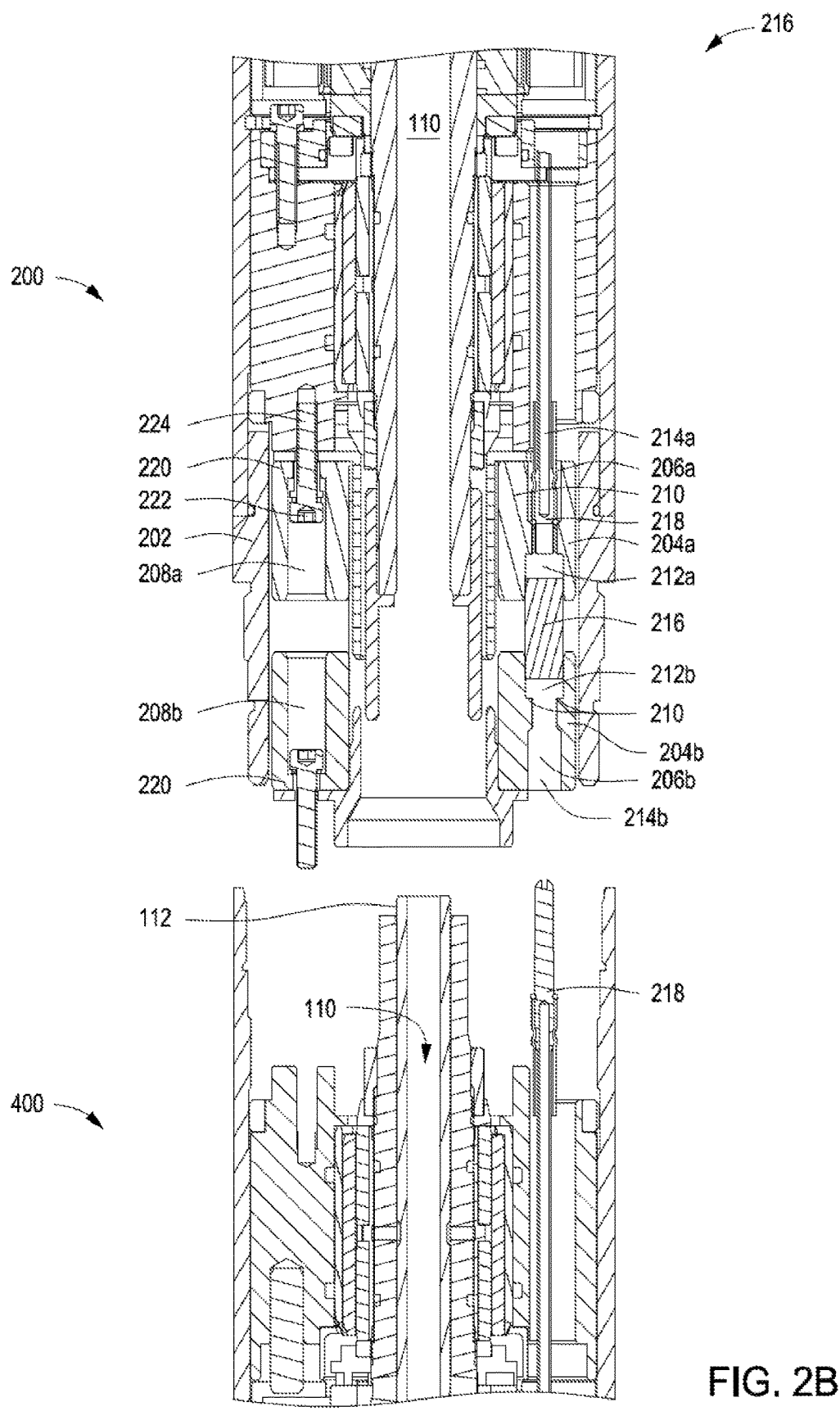
FIG. 2B shows a cross-sectional side view of a module coupler for coupling components of an ESP assembly.

FIG. 2B illustrates a close-up, cross-sectional side view of the module coupler 200. Each end of the module coupler 200 is capable of being coupled to an end of a motor head module 300, a power module 400, or a cooling pump module 500. Via the module coupler 200, multiple power modules 400 may be coupled in a motor section 104 to accommodate various pumping requirements for each downhole operation.

Figure 2C:
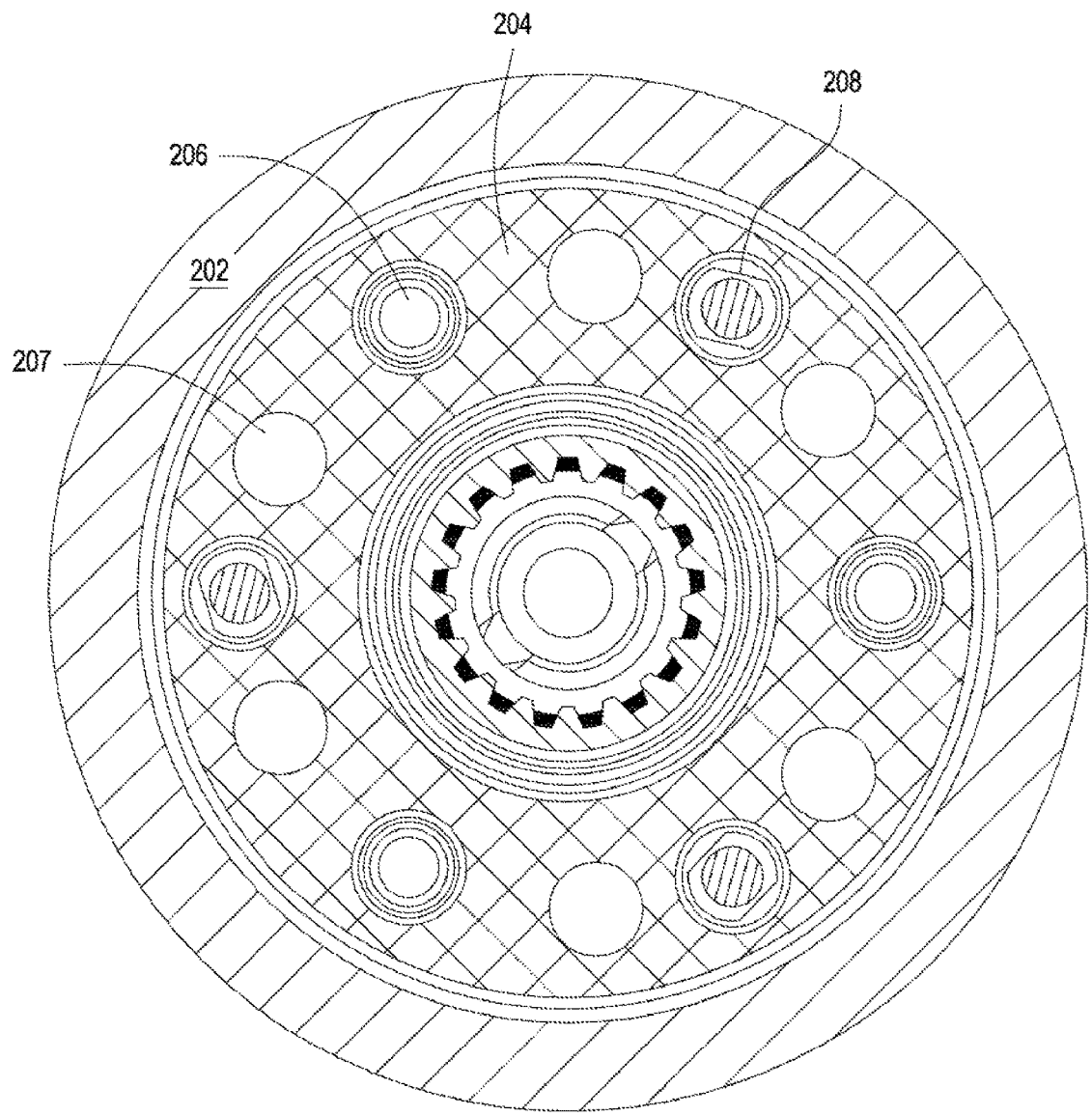
FIG. 2C shows a cross-sectional top view of the module coupler of FIG. 2B.

The module coupler 200 includes a housing 202, a first coupler body 204a and a second coupler body 204b. Each coupler body 204 may include a plug aperture 206, fluid aperture 207, and a fastening aperture 208, as shown in FIG. 2C. Each aperture 206, 207, and 208 may axially extend through each coupler body 204.

A shoulder 210 may extend from each coupler body 204 within each plug aperture 206. Further, each shoulder 210 may define a plug coupler aperture portion 212 and a plug insert aperture portion 214 within each plug aperture 206.

The module coupler bodies 204a, 204b may be disposed concentrically within the housing 202. Preferably, the coupler bodies 204s, 204b are adjacent to each other. In some cases, the coupler bodies 204a, 204b may not be in physical contact with each other such that a clearance exists between the coupler bodies 204a, 204b; that is, those bodies define a clearance between each other. Furthermore, the module coupler bodies 204a, 204b may be oriented so that the respective plug apertures 206, fluid apertures 207, and the fastening apertures 208 of the coupler bodies 204g, 204b are axially aligned correspondingly. Moreover, the plug aperture 206 of the coupler body 204a may be in fluid communication with the plug aperture 206 of the coupler body 204b.

Still referring to FIG. 2B, a plug coupler 216 may be disposed within the plug coupler aperture portions 212a, 212b. Each end of the plug coupler 216 is capable of receiving a plug 218. One opposing end of the plug coupler 216 may be disposed in one opposing plug coupler aperture portion 212a, 212b. The axial length of the plug coupler 216 may be shorter than the combined axial length of the plug coupler aperture portions 212a, 212b. Also, the outer diameter of the plug coupler 216 is preferably larger than the diameter of each plug insert aperture portion 214. Thus, the plug coupler 216 may be confined (yet still movable) between the plug coupler aperture portions 212*, 212b of the module coupler bodies 204a, 204b that are positioned adjacent to each other.

Additionally, the outer diameter of each plug 218 is preferably smaller than the diameter of each plug insert aperture portion 214 to define a clearance between the plug 218 and coupler body 204. The plug 218 may be extended through the shoulder 210 to mate with an upper end of the plug coupler 216.

In some cases, where the outer dimensions of the plug coupler 216 and the plugs 218 are smaller than those of the plug aperture 206, lubricant may flow through the plug apertures 206 despite the presence of the plug coupler 216 and plugs 218 therein. Furthermore, on each module coupler body 204, the fastening aperture 208 includes a shoulder 220. A threaded assembly 222 may include a head that is abutted against each shoulder 220. The threaded assembly 222 may also include a threaded portion 224 that extends past the shoulder 220 and is capable of being threadably coupled to the housing of an adjacent motor section component, e.g., motor head module 300, power module 400, or cooling pump module 500.

Figure 3:
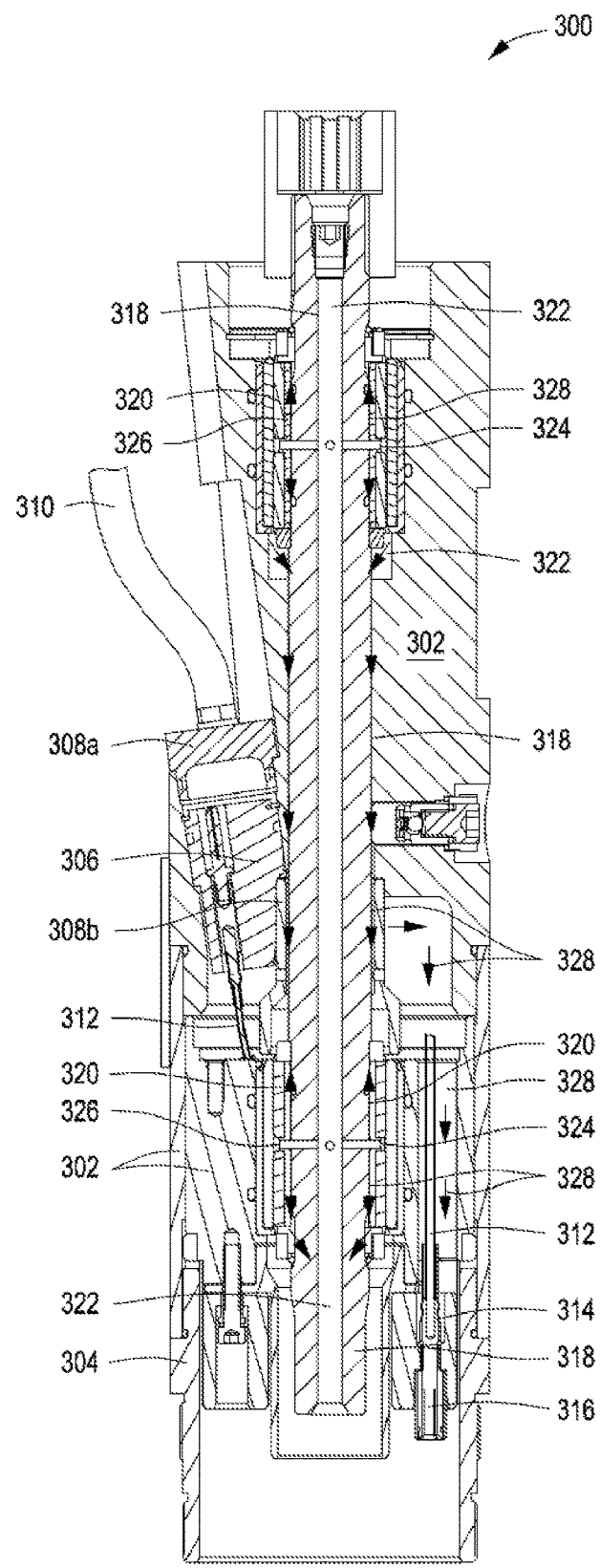
FIG. 3 shows a cross-sectional side view of a motor head module.

FIG. 3 illustrates a cross-sectional side view of a motor head module 300 of a motor section 104. The motor head module 300 includes a housing 302. The housing 302 surrounds and protects internal components from contact with wellbore fluids. At its upper end, the motor head module 300 is capable of being coupled to the seal thrust chamber 600 of the seal section 106. At its lower end, the motor head module 300 may include a module coupler 304.

A pothead connector 308 may be coupled to the housing 302. The pothead connector 308 may have an upper end coupled to a power cable 310. Additionally, the pothead connector 308 may have a lower end coupled to electrical wires 312. The electrical wires 312 may extend from the pothead connector 308 toward the module coupler 304, as shown in FIG. 3. Furthermore, the electrical wires 312 may be coupled to a plug 314. The plug 314 may be coupled to a plug coupler 316.

Still referring to FIG. 3, a shaft assembly 318 may be disposed concentrically within the housing 302 of the motor head module 300. The shaft assembly 318 may extend from the upper end to the lower end of motor head module 300. Furthermore, bearing assemblies may be disposed around the shaft assembly 318 and may be coupled to the housing 302 of the motor head module 300.

A central lubricant passage 322 may extend through at least a portion of the shaft assembly 318. Specifically, the central lubricant passage 322 may extend through the lower end of the shaft assembly 318.

Lubricant ports 324 may extend from the central lubricant passage 322 through the outer diameter of the shaft assembly 318. Through the lubricant ports 324, lubricant may be discharged in a symmetrical outward pattern into a clearance 326 between the shaft assembly 200 and a bearing assembly 320. Presence of the lubricant in the clearance 326 may reduce friction between the shaft assembly 200 and bearing assembly 320 as the shaft assembly 200 rotates during operation.

During operation, lubricant may be discharged into the clearance 326 and may flow away from the bearing assembly 320 into a flow path 328. The lubricant flow in the flow path 328 is traced by arrows 330 in FIG. 3. The flow path 328 may extend in a direction towards the plug 314 in the lower end of the motor head module 300. When pressurized to a threshold pressure, the lubricant may flow through the plug coupler 316.

Figure 4A:
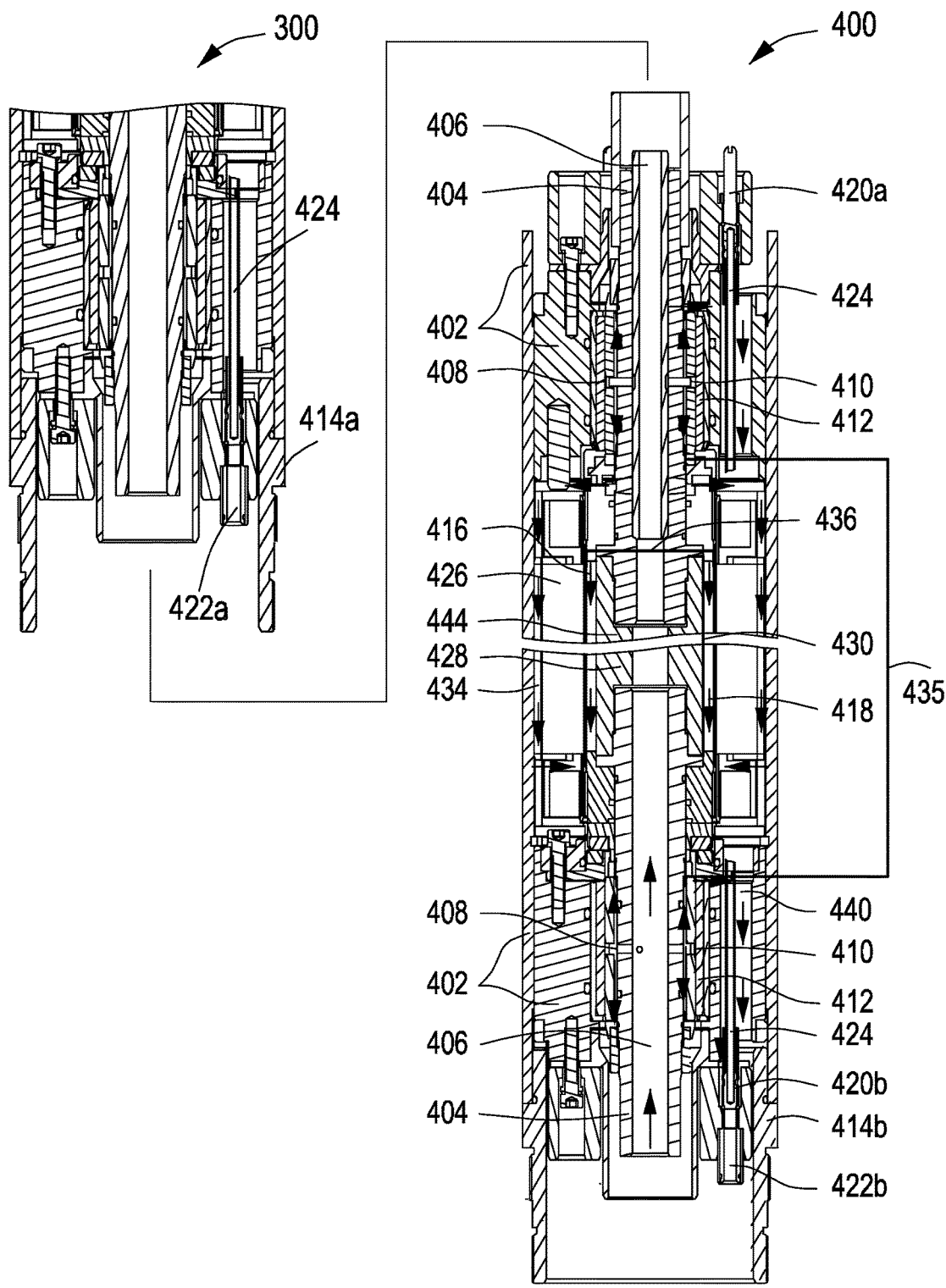
FIG. 4A shows a cross-sectional side view of a power module.
Figure 4B:
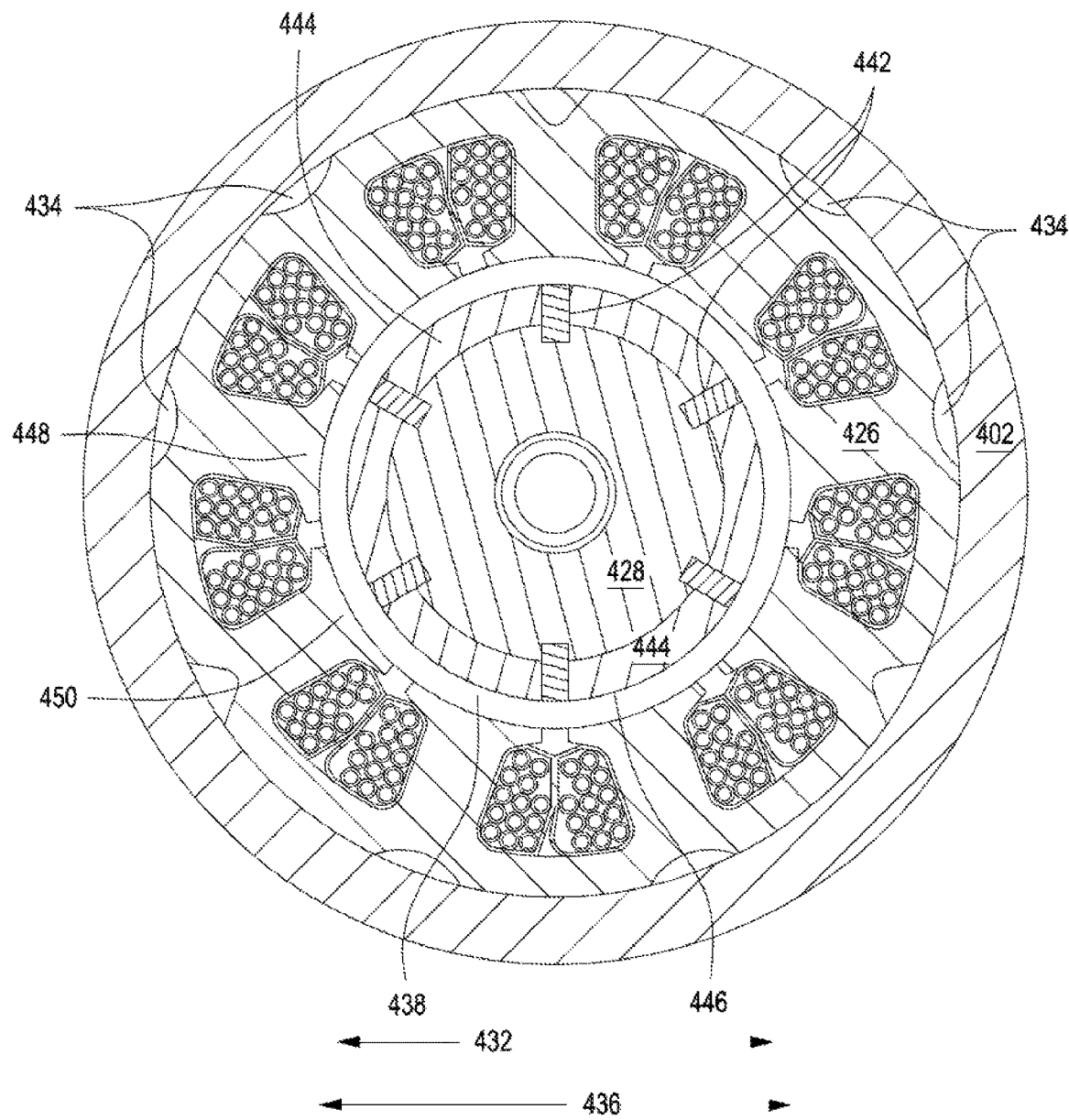
FIG. 4B shows a cross-sectional top view of the permanent magnet motor.

FIG. 4A illustrates a cross-sectional side view of a power module 400. The power module 400 includes a housing 402, a stator 426, and a rotor 428. The housing 402 may surround and protect the stator 426, the rotor 428, and other internal components from contact with wellbore fluids. The power module 400 may include module couplers 414a, 414b at each end. Other versions of the power module 400 may include a module coupler 414 at one end.

The rotor 428 may include one or more shaft assemblies 404. A central lubricant passage 406 may extend through the rotor 428, including each shaft assembly 404, as shown in FIG. 4A.

Lubricant ports 408 may extend from the central lubricant passage 406 through the body of the shaft assembly 404. Through the ports 408, lubricant may flow, e.g., be discharged in a symmetrical outward pattern, e.g., radially outward into an annular clearance 410 between the shaft assembly 404 and bearing assemblies 412. Presence of the lubricant in the clearance 410 may reduce friction between the shaft assembly 404 and bearing assemblies 412 as the shaft assembly 404 is rotated during operation.

During operation, lubricant may be flowed up the central lubricant passage 406 of the shaft assembly 404, discharged into the clearance 410 may flow in the flow path 416, as traced by arrows 418 in FIG. 4A. In the power module 400, the flow path 416 is a conduit that extends along spaces, e.g., annuli and/or clearances, defined by surfaces of different structures and components, e.g., shaft assemblies, bearing assemblies, rotor, stator, and/or impeller, disposed therein. The lubricant may flow between the different spaces.

As shown in FIG. 4A, lubricant may be flowed up the central lubricant passage 406 of the shaft assembly 404. Next, the lubricant may be discharged through one or more ports 408 into the clearance 410. Once discharged in the clearance 410, the lubricant may flow between surfaces of the bearing assemblies 412 and the shaft assembly 404. Additionally, the lubricant may flow between the inner surface of the stator 426 and the outer surface of the rotor 428. Also, the lubricant may flow between the inner surface of the housing 402 and outer surface of the stator 426. Furthermore, the lubricant may flow in the flow path 416 in a direction towards the module couplers 404a, 404b. The lubricant may flow through one or more apertures of each module couplers 404a, 404b into other modules or sections, as discussed below.

Still referring to FIG. 4A, a plug coupler 422a may be disposed in a module coupler 404a and a plug coupler 422b may be disposed in a module coupler 404b. A plug 420a may be coupled to a plug coupler 422a disposed in the module coupler 404a. Electrical wires 424 may be coupled to the plug 420s. The electrical wires 424 may extend towards, and may be coupled to, a plug 420b. The plug 420b may be coupled to the plug coupler 422b.

Additionally, the electrical wires 424 may be coupled to a motor. In various versions, the power module 400 may include one or more motors selected from different types of motors, e.g., electrically excited, permanent magnet, brushless, switched reluctance, cage and wound rotor induction, or ironless or coreless rotor. Specifically, FIG. 4A illustrates an example of a permanent magnet motor (PMM).

FIG. 4B illustrates a cross-sectional top view of the PMM of the power module 400. The PMM includes a stator 426 and a rotor 428. The stator 426 and the rotor 428 may be disposed within the housing 402. The rotor 428 may be disposed within the stator 426.

The stator 426 may have an outer surface and an inner surface. The inner surface may define a central aperture of the stator 426. The cross-sectional area of the central aperture has an inner diameter 436 ("d") which is defined herein as the inner diameter of the stator 426. One or more flow paths 434 may be disposed axially along the outer surface of the stator 426 opposite a lamination tip 448 of the stator 426, as shown in FIG. 4B. Each flow path 434 may extend across the entire length of the stator 426, and lubricant may flow through those flow paths. Furthermore, each flow path 434 may have a portion open to the housing 402 such that lubricant passing through the flow path 434 may remain in physical contact with the stator 426 and the housing 402 to provide for the transfer of heat from the stator 426 to the housing 402.

As shown in FIGS. 4A-B, the rotor 428 may include a rotor body, one or more shaft assemblies 404, and a magnetic portion 430 that includes one or more magnets 444. Additionally, the magnetic portion 430 of the rotor 428 may be disposed within the stator 426.

When the PMM is in operation, electric current may be passed through the windings of the stator 426. The electric current may cause the stator 426 to heat up. Heat from the stator 426 may be transferred to lubricant that passes along and through the flow path 434.

Because the lubricant may also be in physical contact the housing 402, heat may be transferred from the stator 426 (via the lubricant) to the housing 402. From the housing 402, heat may be transferred to cooler wellbore fluid that may surround the housing 402.

Figure 5:
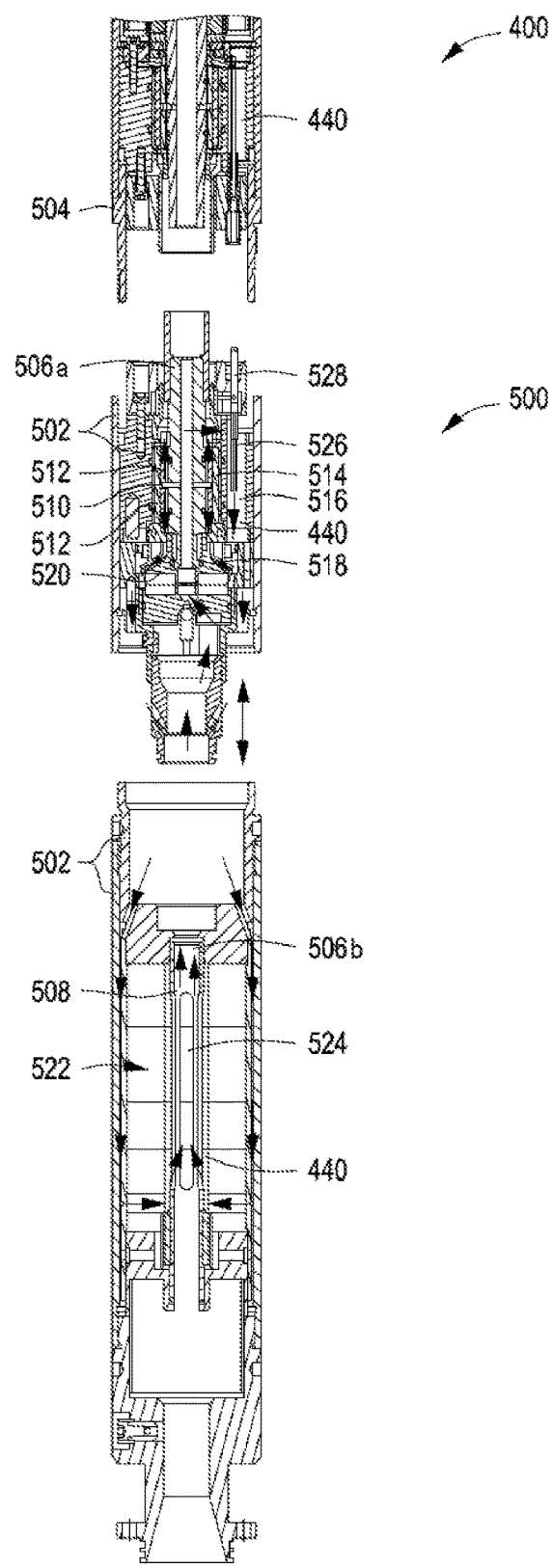
FIG. 5 shows a cross-sectional side view of cooling pump module.

Referring to FIG. 4B and FIG. 5, the flow path 434 may be in fluid communication with a fluid reservoir 440 below the stator 426. Thus, fluid may be flowed (via a flow path 516) between the fluid reservoir 440 of a power module 400 a fluid reservoir 440 of the cooling pump module 500.

Returning to FIG. 4A and FIG. 4B, the rotor 428 includes a magnetic portion 430 that has an outer diameter 432. Preferably, the stator 426 and the magnetic portion 430 of the rotor 428 have the same axial length. Additionally, the outer diameter 432 of the magnetic portion 430 may be smaller than the inner diameter 436 of the stator 426 so that an annular clearance 438 may be defined between the rotor 428 and the stator 426, as shown in FIG. 4B. Lubricant may flow through the annular clearance 438. Also, the annular clearance 438 may be in fluid communication with the fluid reservoir 440 (FIG. 5)

Referring to FIG. 4B, one or more magnets 444 may be part of the magnetic portion 430 of the rotor 428. Each magnet 444 may be an arcuate wall, e.g., a magnet with an arcuate shape. Additionally, a projection 442 or other structure may be disposed between adjacent magnets 444. Each projection 442 may be integral with the rotor 428 or coupled to the rotor 428 in some other way.

Preferably, adjacent magnets 444 are arranged with unlike magnetic poles of the magnets 444 disposed adjacent to each other. For instance, the north pole of one magnet 444 is disposed adjacent to the south pole of another magnet 444.

Each magnet 444 may be coupled to the outer surface of the rotor 428, e.g., with adhesive. Furthermore, a non-magnetic sleeve 446 may be slidably coupled to the outer surface of the magnetic portion 430 of the rotor 428 to secure the magnets 444. Additionally, the sleeve 446 may provide additional stiffness to the rotor 428. The sleeve 446 may define the outer diameter of the rotor 428. The annular clearance 438 may be a space between the outer diameter of the rotor 428 and the inner diameter of the stator 426. Preferably, the outer cylindrical surface of the sleeve 446 is sufficiently smooth so that a constant radial distance can be maintained between the stator 426 and the rotor 428.

In the ESP assembly 100, the power module 400 may be configured to provide sufficient mechanical power to drive the pump section 108 to deliver a desired lift rate, i.e., volume over time, of wellbore fluid to the surface. Mechanical power of the power module 400 may be calculated as Mecahnical Power=$(T*N)/5252$ where T is the torque, e.g., twisting force, applied to the rotor 428 by electric current passed through windings of the stator 426 and N is the rotational speed, e.g., the number of revolutions the rotor 428 can complete in one minute, of the rotor 428. One or more dimensions, e.g., length or inner diameter, of the stator 426 may be configured so that sufficient rotational speed and/or torque of the PMM are generated. Additionally, one or more dimensions, e.g., length or outer diameter, of the rotor 428 may be configured so that sufficient rotational speed and/or torque of the PMM are generated. Also, one or more dimensions, e.g., length or thickness, of the one or more magnets 444 may be configured so that sufficient rotational speed and/or torque of the PMM is generated.

However, the limited diameters of wellbores in typical oil and gas wells limit how much torque and rotational speed may be produced by the power module 400. For example, given the relatively small diameter of a typical oil or gas wellbore, the diameter and thickness of a stator will be limited, which accordingly limits the torque that can be produced by the stator. Therefore, a balance between competing dimensions of the power module 400 should be considered to provide high-speed rotation and/or torque and minimize internal sources of power loss.

In the ESP assembly 100, the high-speed permanent magnetic motor (PMM) of the power module 400 is capable of operation at rotational speeds of 1,500 rpm, 2,000 rpm, 3,000 rpm, 4,500 rpm, 7,000 rpm, 10,000 rpm, 12,000 rpm, or greater to generate desired horsepower.

The rated speed of a PMM is a function of the diameter of the magnetic portion of the rotor. Generally, the smaller the diameter of the magnetic portion the higher the rotational speeds that can be generated for the PMM. However, a smaller-diameter rotor tends to experience more vibration and warping during operations at high rotational speeds than that experienced by a rotor having a larger diameter, so at some point a smaller-diameter rotor is detrimental to the operation of the power module. Additionally, a rotor with a smaller diameter has less inner surface area for receiving permanent magnets than a rotor having a larger diameter, so that less magnetic force can be generated, and less torque can be applied to the rotor, which results in lower rotational speed. As used herein the terms "smaller" and "larger" are relative terms.

Generally, to maximize rotational speeds while minimizing vibration and instability of the PMM, the rotor must be sized to have a diameter as large as possible, but not to equal or exceed the diameter of the central aperture of the stator. Accordingly, a clearance 438 may be defined between the rotor 428 and stator 426 due to the difference in diameter of the rotor 428 and diameter of the inner surface of the stator 426.

In cases where the radial distance between the inner surface of the stator 426 and the outer surface of the magnetic portion 430 of the rotor 428 is below 0.25 mm, lubricant in the clearance 438 may be sheared by the high-speed rotation of the rotor 428 resulting in laminar flow of the lubricant. The problem with laminar flow is that the lubricant tends to retain more heat within the power module 400 than it does with turbulent flow. The internal heating caused by these losses tend to reduce motor life by aging the materials and components in the power module 400. Loss of motor efficiency and power may result.

Generally, a motor that has smaller radial distance between the inner surface of the stator 426 and the outer surface of the magnetic portion 430 of the rotor 428 provides higher driving force from the stator 426 against the magnets 444 when compared to a larger radial distance. Correspondingly, a motor that has a larger radial distance between the inner surface of the stator 426 and the outer surface of the magnetic portion 430 of the rotor 428 provides lower driving force from the stator 426 against the magnets 444 when compared to a smaller radial distance. However, in some cases, providing a larger percentage of radial distance may result in a relatively smaller percentage decrease in driving force. For example, rotors that include magnets 444 with a 2.0 mm thickness results in an increase in the radial distance of the clearance 438 from 0.25 mm to 1.25 mm (500% increase) the driving force from the stator are decreased only by 30%.

Preferably, the radial distance of the clearance 438 is 0.5 mm. However, the designer may use the known Reynolds number theory to estimate the desired radial distance between the inner surface of the stator 426 and the outer surface of the magnetic portion 430 of the rotor 428 for various operating conditions, lubricants, and motor sizes. Although friction loss may be higher in turbulent flow than in laminar flow, turbulent flow ensures more effective heat transfer away from the rotor 428 and the stator 426. At any speed a large clearance may reduce the likelihood of mechanical damage to the rotor 426 during installation caused by bending of the housing 402 and provide a measure of tolerance to contaminant particles therein.

In configuring torque that the power module 400 may generate, thickness of the stator 426 may be considered. A thicker stator may have more electrical windings to produce more torque than a thinner stator with fewer windings.

Alternatively, the ratio of the length 435 of the rotor 428 between the bearing assemblies 412 and the inner diameter 436 of the stator 426 may be considered in configuring torque. Wellbore diameters typically range from 4.50 inches to 20.00 inches. Accordingly, the ESP assembly 100 and the stator 426 must be sized to fit into the wellbore 102. Additionally, the inner diameter 436 of the stator 426 must be sized to receive the rotor 428. In some cases, a longer rotor may receive more turning force, e.g., torque, than a shorter rotor. However, a longer rotor may suffer more vibration and warping from inertia and twisting from applied torque during operations at high rotational speeds than a shorter rotor. Therefore, the designer should balance between the length 435 (L) of the rotor 428 between the bearing assemblies 412 and the inner diameter 436 (d) of the stator 426. Preferably, the power module 400 has a stator 426 having an inner diameter 436 (L) and a rotor 428 having a length 435 (d) between the bearing assemblies 412 such that the ratio of L/d is from 7.00 to 13.00 (in rationalized units). Additionally, the ratio may include 7.01, 7.50, 8.00, 8.50, 9.00, 9.50, 10.00, 10.50, 11.00, 11.50, 12.00, and 12.50.

Referring to FIG. 4C, the table 450 shows that the power module 400 may perform sufficiently based on dimensions of various components, e.g., the housing, stator, or rotor, of the power module 400. For instance, in ESP assemblies 100 where the length 435 (L) of the rotor 428 between the bearing assemblies 412 (FIG. 4A) divided by the inner diameter 436 (d) of the stator 426 (FIG. 4B) yields a ratio of 7.14, 7.93, or 9.52 (in rationalized units), each ESP assembly 100 was found to deliver acceptable downhole fluid flow rate.

Thus, referring to FIGS. 4A-C, based on an l/d ratio from 7.00 to 13.00, a length 435 (L) of the rotor 428 between the bearing assemblies 412 may be calculated based on an inner diameter 436 (d) of the stator 426. Conversely, an inner diameter 436 (d) of the stator 426 may be calculated based on a length 435 (L) of the rotor 428 between the bearing assemblies 412.

Additionally, once an inner diameter 436 (d) of the stator 426 has been calculated, an outer diameter 446 of the rotor 428 may be calculated by subtracting a desired radial distance, e.g., 0.50 mm, of the clearance 438 from inner diameter 436 of the stator 426.

Many wellbores are deviated from vertical and even to the horizontal. Long motor/pump combinations may be damaged by operator mishandling and/or bending during deployment through the curved sections of the borehole. Small deflections of the motor housing can cause the rotor to impact on the stator. Furthermore, the slender ESP assembly may be difficult to handle and may suffer additional damage during operation in the deviated or horizontal wellbores. Modular design of the power module 400 may be suited for such wellbores.

As described above, the power module 400 may be coupled, via module couplers 414a, 414b, to other power modules 400 to deliver necessary pumping power. The module couplers 200 may provide for bending and misalignment tolerances while limiting performance impact to the power modules 400. Each power module 400 may be constructed using the ratio, L/d, to minimize deflection in deviated or horizontal wellbores compared to longer, known ESP motors.

During operations at high speeds, ESP motors tend to generate heat. Without proper dispersal, heat can cause damage to a motor and diminish the strength of the magnets on the motor. The motor may have to work harder to produce an acceptable output. Thus, the motor section 104 may include a cooling pump module 500 coupled to the power module 400 to provide cooling of hot lubricant that may circulate from other parts of the motor section 104.

FIG. 5 shows a cross-sectional side view of a cooling pump module 500. The cooling pump module 500 includes a housing 502 that surrounds and protects internal components from contact with wellbore fluids. At its upper end, the cooling pump module 500 may include a module coupler 504.

A shaft assembly 506a may be disposed concentrically within the housing 502. A central lubricant passage 508 may extend through an upper end of the shaft assembly 506a.

Lubricant ports 510 may be disposed through the body of the shaft assembly 506a. The lubricant ports 510 may be in fluid communication with the central lubricant passage 508. Through the ports 510, lubricant may be discharged in a symmetrical, outward pattern into a clearance 512 between the shaft assembly 506s and a bearing assembly 514. Presence of the lubricant in the clearance 512 may reduce friction between the shaft assembly 506a and the bearing assembly 514 as the shaft assembly 506a rotates during operation.

During operation, lubricant discharged into the clearance 512 may move away from the clearance 512 into a fluid reservoir 440. Movement, e.g., flow, of the lubricant in the fluid reservoir 440 may be traced by arrows, as shown in FIG. 5. Furthermore, the arrows may extend in a direction towards an impeller 520 in the lower end of the power module 500.

An impeller 520 may be coupled to a lower end of the shaft assembly 506a. Additionally, the impeller may be disposed in the fluid reservoir 440. During operation, as the shaft assembly 506a is rotated, the impeller 520 may also be rotated. Rotation of the impeller 520 may produce an area of low pressure above the impeller 520 and an area of high pressure below the impeller 520. The difference in pressure between the high-pressure area and low-pressure area causes differential pressure to be created in the fluid reservoir 440. The differential pressure may cause lubricant to flow in the flow path 516 in a direction from the area of high pressure (below the impeller 520) to the area of low pressure (above the impeller 520).

Circulating lubricant that flows away from the impeller 520 in the flow path 516 may flow through a heat exchanger 522, as shown in FIG. 5. The heat exchanger 522 may draw heat away from the pressurized lubricant flowing through the heat exchanger 522. The heat may be transferred from the heat exchanger 522 into cooler wellbore fluid (not shown) surrounding the heat exchanger 522.

In versions where the seal section 106 is below the motor section 104, the flow of lubricant in the fluid reservoir 440 may be reversed.

Referencing the lower end of the cooling pump module 500, as shown in FIG. 5, cooled lubricant from the fluid reservoir 440 may flow into the central lubricant passage 508 of the shaft assembly 506b through ports 524 disposed therethrough. Tracing the arrows 518, the lubricant may be flowed up the central lubricant passage 508 of the shaft assembly 506b. Additionally, the lubricant may be flowed up the shaft assembly 506b to the shaft assembly 506a, which is that is capable of being the shaft assembly 506b. Further, the lubricant may be flowed up the shaft assembly 506a into the shaft assembly 404 (FIG. 4A), which is capable of being coupled to the shaft assembly 506a. As discussed above in relation to FIG. 4A, the lubricant may be discharged into the clearance 410, at which point the lubricant flow is recycled.

Furthermore, electrical wires 526 may be coupled to a plug 528. Also, the electrical wires 526 may be coupled to sensors disposed at the lower end of the cooling pump module 500. The sensor may detect heat and other physical conditions within the ESP assembly 100.

Figure 6:
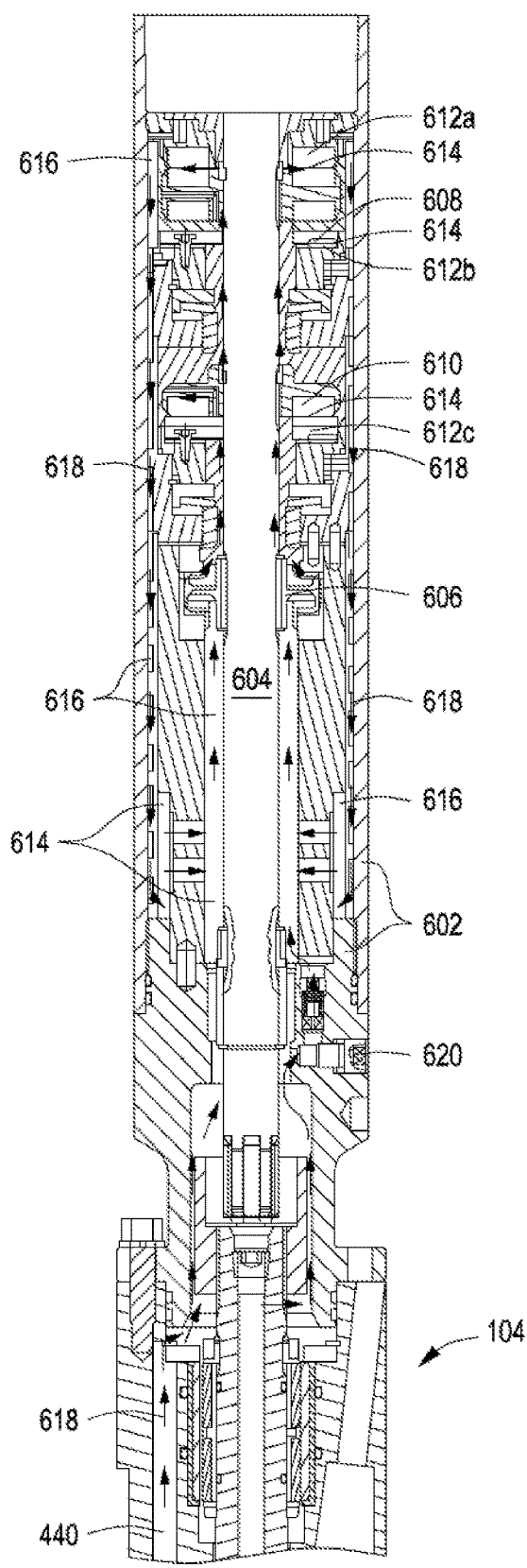
FIG. 6 shows a cross-sectional side view of a thrust chamber module coupled to a motor head module.

FIG. 6 illustrates a cross-sectional side view of a thrust chamber module 600 coupled to a motor head module 300. The thrust chamber module 600 has several functions that may be critical to the operation and run-life of the ESP system 100. One, along with the seal chamber module (not shown), the thrust chamber module 600 may protect lubricant in the motor section from contamination by the wellbore fluid. Wellbore fluid migration into the motor can potentially cause premature electrical or mechanical failures through the reduction of the motor dielectric or lubricating properties. Two, the thrust chamber module 600 may provide for pressure equalization between the interior of the motor section and the wellbore. The thrust chamber module 600 may compensate for pressure variances caused by submergence pressure encountered during installation from surface pressure to downhole static pressure, thermal expansion, and/or contraction of the motor lubrication caused by heat buildup in the motor section during operation. Three, the thrust chamber module 600 may also absorb axial thrust produced by a pump section and may dissipate heat and pressure generated by the motor section.

The thrust chamber module 600 includes a housing 602 having an inner surface. The housing 602 may surround and protect internal components and assemblies from contact with wellbore fluids. The inner surface of the housing 602 may define a fluid reservoir 616 that is configured to be filled with fluid, e.g., lubricant. The fluid reservoir 616 may have an upper end and a lower end.

A body may be disposed within and may be coupled to the housing 602. The body may include thrust bearing assemblies 612*a-c* and other internal components coupled together. An upper runner thrust bearing assembly 612*a* may be positioned adjacent to the upper portion of a thrust runner 608. A lower runner thrust bearing assembly 612*b* may be positioned adjacent to the lower portion of the thrust runner 608. A thrust bearing assembly 612*c* may be position adjacent to a thrust pad 610. Also, each assembly of the body may have a central aperture. Thus, when the assemblies are coupled to form the body, the central apertures of the assemblies align to form a central aperture of the body.

Additionally, one or more flow paths 618 may be disposed on an outer surface of the body. Arrows may trace the flow of lubricant in the one or more flow paths 618. Furthermore, the arrows show that the one or more flow paths 618 may be in fluid communication with the fluid reservoir 616.

A shaft assembly 604 may be disposed within the internal assembly in the fluid reservoir 616. The shaft assembly 604 may have an impeller coupled, a thrust runner 608, and a thrust pad 610 coupled to the outer perimeter of the shaft assembly 604. The thrust runner 608 may extend from the shaft assembly 604 in-between the thrust bearing 612*s*, 612*b*. Additionally, the thrust pad 610 may extend from shaft assembly 604 over the thrust bearing 612*c*. In some cases, the thrust runner 608 and the thrust pad 610 may not be in physical contact with the thrust bearing 612*a-c*. Thus, a clearance may exist between the thrust runner 608 and the thrust bearings 612*a*, 612*b* and the thrust pad 610 the thrust bearings 612*c*.

Before operation, the housing 602 may be filled with pressurized lubricant. The lubricant may occupy clearances 614. Presence of the lubricant in the clearances 614 may prevent physical contact between the thrust runner 608 and thrust bearings 612*a*, 612*b*. Additionally, presence of the lubricant in the clearances 614 may prevent physical contact between the thrust pad 610 and the thrust bearing 612*c*. Furthermore, the lubricant may flow across the bearing assemblies 612*a-c* into the fluid reservoir 616.

Movement, e.g., flow, of the lubricant in the fluid reservoir 616 may be traced by arrows, as shown by in FIG. 6. Additionally, the arrows illustrate a loop upon which lubricant may be communicated between the one or more flow paths 618 and the fluid reservoir 616.

During operation, the thrust chamber module 600 may generate heat. Without proper dispersion, heat can cause damage to components and seals in the module. Thus, the impeller 606 may be used to provide heat dispersion. As the shaft assembly 604 rotates within the fluid reservoir 616, the impeller 606 may also rotate. Rotation of the impeller 606 may produce an area of high pressure above and an area of low pressure below the impeller 606. The difference in pressure between the high-pressure area and low-pressure area causes differential pressure to be created in the fluid reservoir 616. The differential pressure may cause lubricant to be circulated in the fluid reservoir 616 in a direction from the area of high pressure (above the impeller 606) to the area of low pressure (below the impeller 606).

As shown by arrows in FIG. 6, lubricant may be drawn upward from the lower end of the fluid reservoir 616 across the impeller 606. Referring to the arrows, the lubricant may be pushed away from the impeller 606 towards the upper end of the fluid reservoir 616. Near the upper end of the fluid reservoir 616, lubricant may be pushed through the clearances 614. Additionally, the lubricant may receive heat from the bearings 612*a-c*. Following the arrows, the heated lubricant may be circulated back down through the one or more flow paths 618 towards the lower end of the fluid reservoir 616.

As the hot lubricant is circulated in the one or more flow paths 618, the lubricant may be in physical contact with the housing 602. Heat may be conducted from the lubricant to the housing 602. Additionally, heat from the housing 602 may be transferred to cooler wellbore fluid (not shown) surrounding the housing 602.

Referring to FIG. 6, the lower end of the fluid reservoir 616 may be in fluid communication with the fluid reservoir 440 of the motor section 104, as shown in FIG. 6.

Before operation of the ESP assembly 100, the motor section 104 may be filled with a first volume of lubricant and the thrust chamber module 600 may be filled with a second volume of lubricant.

During operation, lubricant in the motor section 104 may expand due to heat and/or pressure buildup. The lubricant in the fluid reservoir 440 of the motor section 104 may expand into the fluid reservoir 616 of the thrust chamber module 600. Once the volume of lubricant in the thrust chamber module 600 exceeds a threshold value, check valves (not shown) may be actuated to an open position so the lubricant may escape into the wellbore. Conversely, reduction in heat and pressure in the motor section 104 may cause the lubricant to contract from the thrust chamber module 600.

Figure 7:
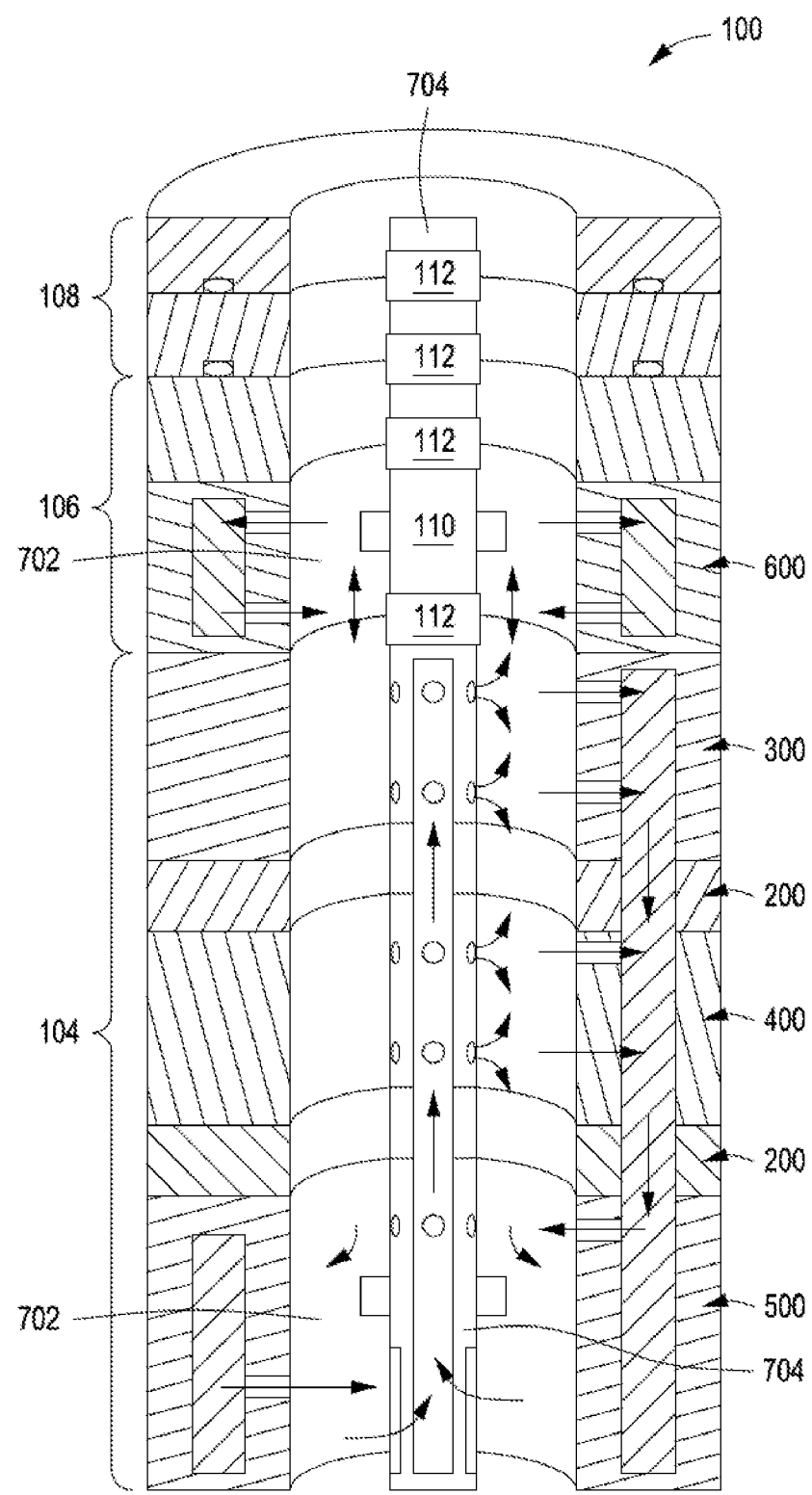
FIG. 7 shows a block diagram of an ESP assembly having flow paths and fluid reservoirs.

FIG. 7 illustrates flow paths and fluid reservoirs of an exemplary ESP assembly 100. A fluid reservoir 702 may be formed by the thrust chamber module 600, the motor head module 300, the power module 400, and the cooling pump module 500. As shown in FIG. 7, arrows may trace the flow of lubricant in the fluid reservoir 702 and flow paths of the ESP assembly 100.

Prior to being run downhole, an ESP assembly 100 may be assembled with various sections, e.g., power section, seal section, and pump section, in which each section may include a selection of modular components appropriate for operation in a downhole environment and load. Prior to running the ESP assembly 100 downhole, a motor section 104 may be injected with lubricant, e.g., dielectric motor oil, via a fill plug 620 (FIG. 6). The volume of lubricant to be used should correspond to the volume of the fluid reservoir 702 formed by the modules assembled.

What is claimed as the invention is:

1. An electric submersible pump assembly for pumping fluids from a wellbore, comprising:
   a pump;
   a motor assembly coupled to the pump, the motor assembly comprising:
      a first housing;
      a stator disposed in the first housing, wherein the stator has an inner surface that defines a diameter;
      a rotor disposed in the stator;
      a first bearing assembly disposed around the rotor; and
      a second bearing assembly disposed around the rotor;
      wherein the rotor has length separating the first bearing assembly from the second bearing assembly, and the length divided by the diameter of the inner surface of the stator yields a ratio from 7.00 to 13.00; and
   a module coupler coupled to the motor assembly, the module coupler comprising:
      a second housing;
      an upper coupler body disposed in the second housing, wherein the upper coupler body has an aperture;
      a lower coupler body disposed in the second housing, wherein the lower coupler body has an aperture; and
      a plug coupler having an upper end and a lower end, wherein the upper end of the plug coupler is disposed in the aperture of the upper coupler body.

2. An electric submersible pump assembly for pumping fluids from a wellbore, comprising:
   a pump;
   a motor assembly coupled to the pump, the motor assembly comprising:
      a first housing;
      a stator disposed in the first housing, wherein the stator has an inner surface that defines a diameter;
      a rotor disposed in the stator;
      a first bearing assembly disposed around the rotor; and
      a second bearing assembly disposed around the rotor;
      wherein the rotor has length separating the first bearing assembly from the second bearing assembly, and the length divided by the diameter of the inner surface of the stator yields a ratio from 7.00 to 13.00; and
   a module coupler coupled to the motor assembly, the module coupler comprising:
      a second housing;
      an upper coupler body disposed in the second housing, wherein the upper coupler body has an aperture;
      a lower coupler body disposed in the second housing, wherein the lower coupler body has an aperture; and
      a plug coupler having an upper end and a lower end, wherein the lower end of the plug coupler is disposed in the aperture of the lower coupler body.

* * * * *